(12) United States Patent
   Philip (10) Patent No.: US 10,056,827 B2
(45) Date of Patent: Aug. 21, 2018

(54) POWER CONVERTER

(71) Applicant: NXP B.V., Eindhoven (NL)

(72) Inventor: Melaine Philip, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/481,459

(22) Filed: Apr. 7, 2017

(65) Prior Publication Data

US 2017/0294836 A1    Oct. 12, 2017

(30) Foreign Application Priority Data

Apr. 8, 2016 (EP) .................................. 16290065

(51) Int. Cl.
   *H02M 3/07*    (2006.01)
(52) U.S. Cl.
   CPC ............. *H02M 3/07* (2013.01); *H02M 3/073* (2013.01)
(58) Field of Classification Search
   CPC ........ H02M 3/07; H02M 3/073; H02M 3/075; H02M 2003/077
   See application file for complete search history.

(56) References Cited

U.S. PATENT DOCUMENTS

| | | | |
|---|---|---|---|
| 2013/0223650 | A1 | 8/2013 | Takida |
| 2013/0229226 | A1 | 9/2013 | Chiu |
| 2015/0326113 | A1 | 11/2015 | Szczeszynski et al. |
| 2016/0142046 | A1* | 5/2016 | Powell .................. H03K 5/249 327/306 |

FOREIGN PATENT DOCUMENTS

| | | |
|---|---|---|
| EP | 2 712 072 A1 | 3/2014 |
| EP | 2 884 642 A1 | 6/2015 |
| JP | 2004048880 A | 2/2004 |

OTHER PUBLICATIONS

Extended European Search Report for Patent Appln. No. 16290065.8 (dated Oct. 18, 2016).

* cited by examiner

*Primary Examiner* — Jung Kim (57) ABSTRACT

One example discloses a switching capacitive power converter, SCPC, including: an energy storage element; a voltage reference controller, and configured to output an adjusted reference voltage based on a received fixed reference voltage; and a charge pumping circuit configured to operate the SCPC at a charge pumping frequency and configured to charge the energy storage element at the charge pumping frequency if an absolute value of the power converter's output voltage is below an absolute value of the adjusted reference voltage; wherein if the charge pumping frequency is within a predetermined frequency exclusion range, the voltage reference controller is configured to set the adjusted reference voltage to a value such that the charge pumping frequency is no longer within the predetermined frequency exclusion range.

16 Claims, 7 Drawing Sheets

POWER CONVERTER

CROSS-REFERENCE TO RELATED APPLICATIONS

This application claims the priority under 35 U.S.C. § 119 of European patent application no. 16290065.8, filed on Apr. 8, 2016, the contents of which are incorporated by reference herein.

The present specification relates to systems, methods, apparatuses, devices, articles of manufacture and instructions for power conversion.

SUMMARY

According to an example embodiment, a switching capacitive power converter, SCPC, comprising: an energy storage element; a voltage reference controller configured to output an adjusted reference voltage based on a received fixed reference voltage; and a charge pumping circuit configured to operate the SCPC at a charge pumping frequency and configured to charge the energy storage element at the charge pumping frequency if an absolute value of the power converter's output voltage is below an absolute value of the adjusted reference voltage; wherein if the charge pumping frequency is within a predetermined frequency exclusion range, the voltage reference controller is configured to set the adjusted reference voltage to a value such that the charge pumping frequency is no longer within the predetermined frequency exclusion range.

In another example embodiment, the predetermined frequency exclusion range is at least one of: a human audible frequency range; 20 Hz-20 KHz; an NFC communications frequency range; or 100 KHz to 1 MHz.

In another example embodiment, the energy storage element is a capacitor.

In another example embodiment, the SCPC is configured to output a high load current and a low load current; and the charge pumping circuit is configured to operate the SCPC at a higher charge pumping frequency in response to the high load current and at a lower charge pumping frequency in response to the low load current.

In another example embodiment, a charge pumping sequence is equal to a period of the charge pumping frequency; and if less than a first pre-set number of charge pumping sequences are received within a predetermined time period, the voltage reference controller is configured to increment the adjusted reference voltage until the charge pumping frequency is outside of the predetermined frequency exclusion range.

In another example embodiment, a charge pumping sequence is equal to a period of the charge pumping frequency; and if more than a first pre-set number of charge pumping sequences, but less than a second pre-set number of pumping sequences are received within a predetermined time period, the voltage reference controller is configured to keep the adjusted reference voltage at a current value such that the charge pumping frequency remains outside of the predetermined frequency exclusion range.

In another example embodiment, a charge pumping sequence is equal to a period of the charge pumping frequency; and if more than a first and second pre-set number of charge pumping sequences are received within a predetermined time period, the voltage reference controller is configured to decrement the adjusted reference voltage while keeping the charge pumping frequency outside of the predetermined frequency exclusion range.

In another example embodiment, if the adjusted reference voltage reaches a minimum value, the voltage reference controller is configured to stop decrementing the adjusted reference voltage.

In another example embodiment, further comprising a set of switches coupling the charge pumping circuit and the power converter's voltage output to the energy storage element.

In another example embodiment, the SCPC is a DC to DC power converter.

In another example embodiment, the adjusted reference voltage is set with a DAC.

According to an example embodiment, an article of manufacture including at least one non-transitory, tangible machine readable storage medium containing executable machine instructions for power conversion, comprising: wherein the article includes a switching capacitive power converter (SCPC), having: an energy storage element; a voltage reference controller, and a charge pumping circuit; wherein the instructions include: using the voltage reference controller, to output an adjusted reference voltage based on a received fixed reference voltage; and using the charge pumping circuit to operate the SCPC at a charge pumping frequency and charge the energy storage element at the charge pumping frequency if an absolute value of the power converter's output voltage is below an absolute value of the adjusted reference voltage; wherein if the charge pumping frequency is within a predetermined frequency exclusion range, the voltage reference controller sets the adjusted reference voltage to a different value such that the charge pumping frequency is no longer within the predetermined frequency exclusion range.

In another example embodiment, a charge pumping sequence is equal to a period of the charge pumping frequency; and if less than a first pre-set number of charge pumping sequences are received within a predetermined time period, the voltage reference controller increments the adjusted reference voltage until the charge pumping frequency is outside of the predetermined frequency exclusion range.

In another example embodiment, a charge pumping sequence is equal to a period of the charge pumping frequency; and if more than a first pre-set number of charge pumping sequences, but less than a second pre-set number of pumping sequences are received within a predetermined time period, the voltage reference controller keeps the adjusted reference voltage at a current value such that the charge pumping frequency remains outside of the predetermined frequency exclusion range.

In another example embodiment, a charge pumping sequence is equal to a period of the charge pumping frequency; and if more than a first and second pre-set number of charge pumping sequences are received within a predetermined time period, the voltage reference controller decrements the adjusted reference voltage while keeping the charge pumping frequency outside of the predetermined frequency exclusion range.

In another example embodiment, if the adjusted reference voltage reaches a minimum value, the voltage reference controller stops decrementing the adjusted reference voltage.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While these Figures present an example set of embodiments, it should be understood that other embodiments are possible as well. All modifications, equivalents, and alternative embodiments falling within the spirit and scope of the appended claims are covered as well.

DETAILED DESCRIPTION

Switching Capacitive Power Converters (SCPCs) in various example embodiments generate a regulated voltage output from a variable voltage input. The output voltage can have a higher value than the input voltage and it is stable although the input voltage and the output load may change.

Figure 1:
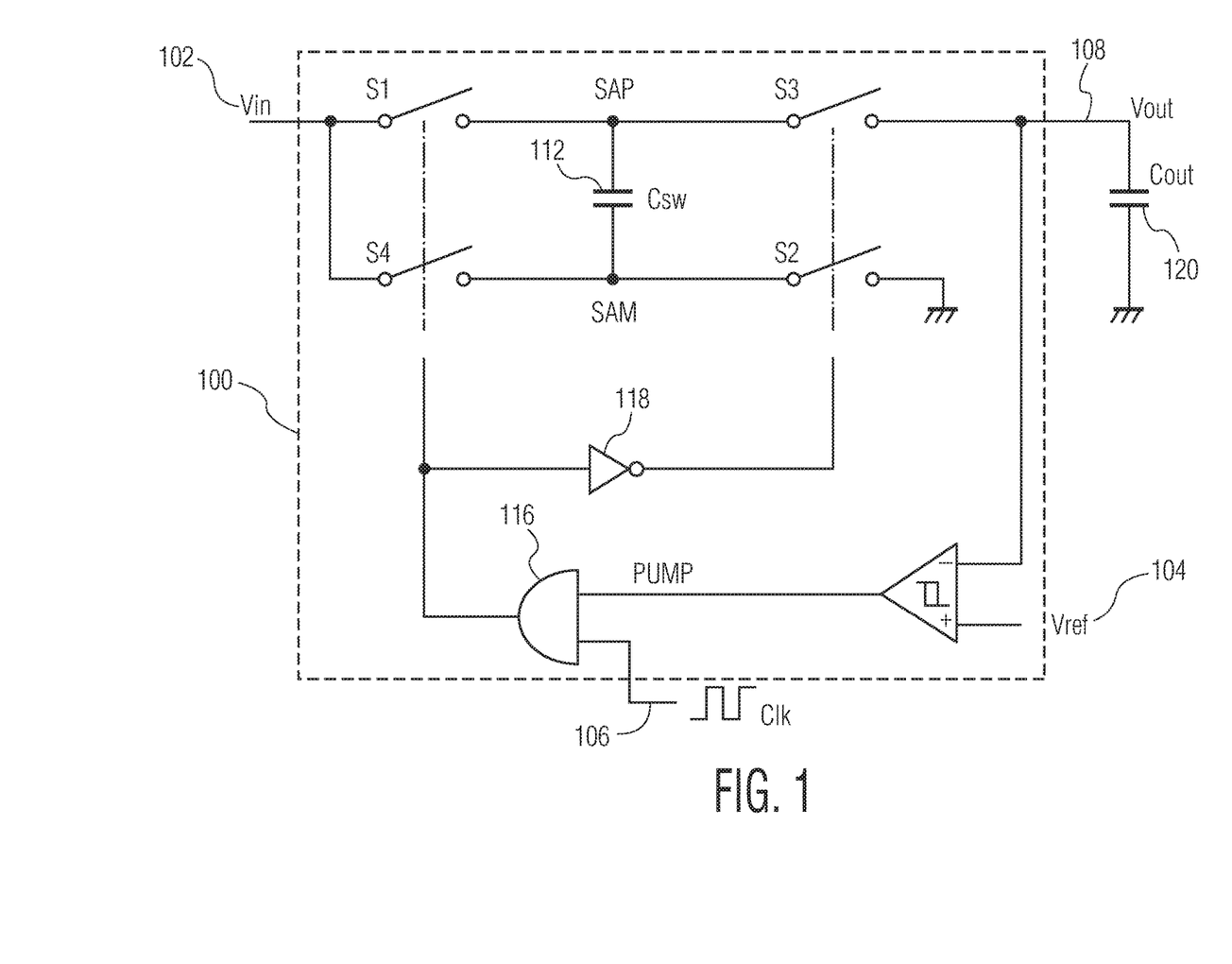
FIG. 1 is a first example of a power converter.

FIG. 1 is a first example of a power converter 100. The first power converter 100 is a Switching Capacitive Power Converter (SCPC) which includes: a voltage input 102 (for receiving voltage VIN); a voltage reference input 104 (for receiving voltage VREF); a clock input 106; a voltage output 108 (for providing voltage VOUT); switches S1, S2, S3, S4; a switched capacitor 112 (e.g. flying capacitor, labeled as CSW); a comparator 114; an enable element 116 (e.g. an AND gate); and an inverter 118 (e.g. a NOT gate). The first power converter 100 is connected to COUT 120 and a load (not shown) at the voltage output 108. The load draws a load current for a given VOUT voltage.

The switched capacitor 112 is charged from VIN on the voltage input 102 and then discharged to the load thus providing charge transfer and a constant VOUT on the voltage output 108.

The SCPC 100 integrates switches S1, S2, S3, S4 and a clock signal (CLK) driven inverter 118 so that the switches S1, S2 and S3, S4 work alternately. The configuration shown generates a VOUT that doubles VIN.

The SCPC 100 operates in two phases, a charge storing phase and a charge transfer to load phase. These two phases are sequenced by the clock signal (CLK). Closing S1 and S2 charges the switched capacitor 112 (e.g. flying capacitor or CSW) to VIN in the first half cycle (i.e. the charge storing phase). In the second half cycle, S3 and S4 open and S1, S2 close (i.e. the charge transfer to load phase). This action connects the negative terminal of the switched capacitor 112 (CSW) to VIN and connects the positive terminal to VOUT.

If VOUT across the load is smaller than that across the switched capacitor 112 (CSW), charge flows from the switched capacitor 112 (CSW) to the load.

The charge storing phase and charge transfer to load phase occurs cyclically, boosting the SCPC's 100 VOUT until reaching a predetermined reference voltage (i.e. VREF) received at the voltage reference input 104. When VOUT reaches VREF, the enable element 116 blocks the CLK signal and switching is stopped. The SCPC 100 then stays in the charge storing phase.

As soon VOUT goes below VREF, the enable element 116 passes the CLK signal to the switches S1, S2, S3, S4, and the SCPC 100 resumes charge pumping by alternating the switches S1, S2, S3, S4 between the charge storing and charge transfer to load phase, until VOUT reaches or goes above VREF.

Figure 2:
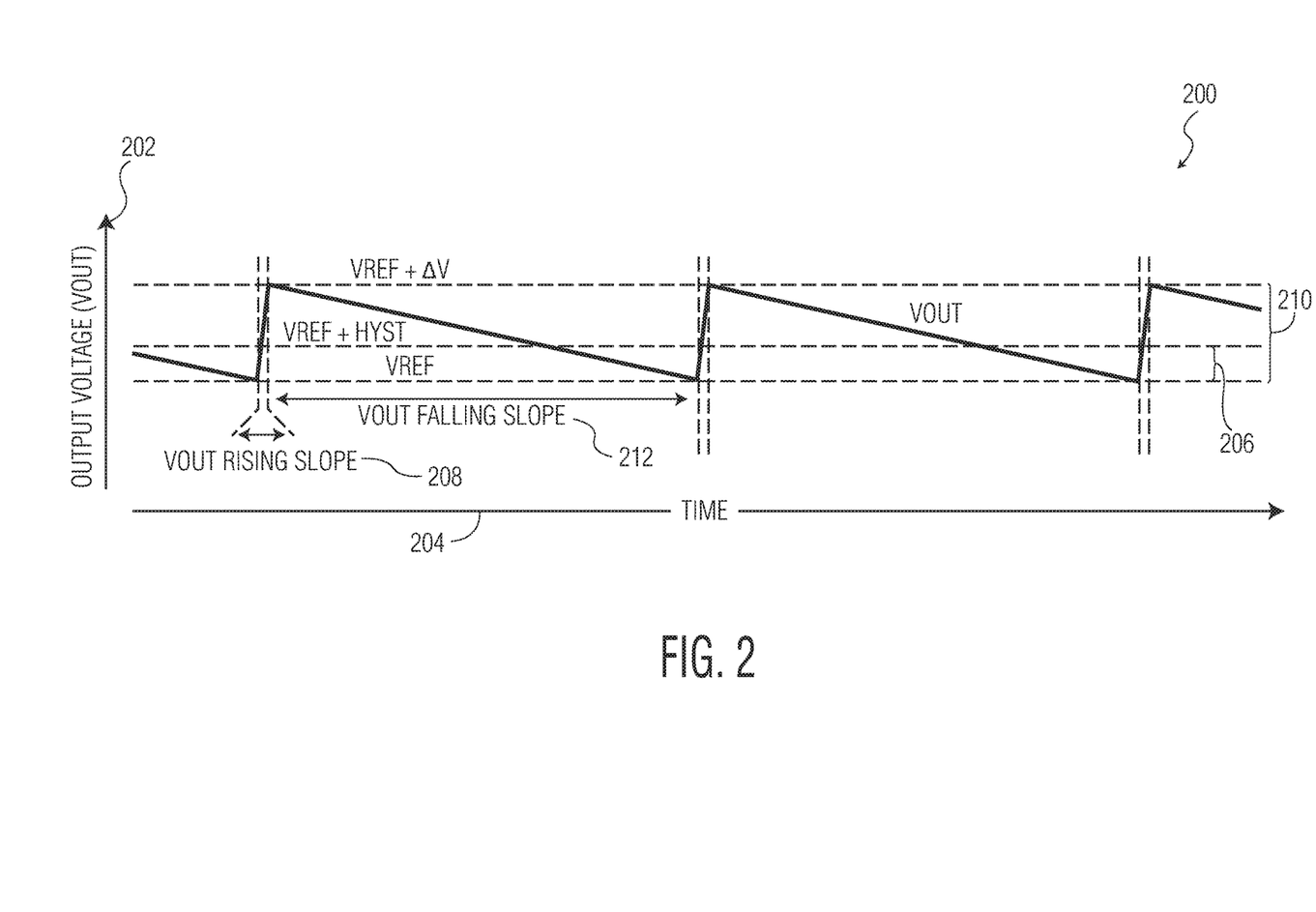
FIG. 2 is an example graph of an output voltage of the first power converter over time.

FIG. 2 is an example graph 200 of an output voltage 202 (VOUT) of the first power converter 100 over time 204 in a steady state.

In an ideal circuit, the SCPC's 100 output voltage VOUT is regulated within a voltage hysteresis window 206 (HYST) by using a voltage hysteresis on the comparator 114. VOUT would ideally be regulated between VREF and VREF+HYST. The threshold voltage for stopping a rising VOUT is VREF+HYST, and the threshold voltage for stopping a falling VOUT is VREF.

During ideal operation, the SCPC 100 pumps charge from VIN to VOUT, and VOUT rises to VREF+HYST. Then the SCPC 100 stops pumping charge (since the CLK is disabled by the enable element 116) and remains in the charge storing phase. Then, VOUT falls linearly from VREF+HYST due to the load's current draw until VOUT=VREF. Then the SCPC 100 resumes pumping charge from VIN to VOUT, until VOUT rises to VREF+HYST again.

However in a real-world circuit, the SCPC's 100 time response is too slow for regulating VOUT within the voltage hysteresis window 206 (HYST). As a result, VOUT's rising slope 208 is too fast for the SCPC's 100 dynamic behavior, and VOUT goes higher than VREF+HYST until reaching VREF+ΔV. HYST can be set by design. For a high HYST, several pumping and storing phases, from VREF to VREF+HYST, may occur. FIG. 2 is illustration for small hysteresis SCPC and/or light load conditions. This additional VOUT ripple 210 (ΔV) is equal to the SCPC's output voltage step up capability.

The SCPC's output ripple 210 (ΔV) is equal to:

$$\Delta V = (2 \times V_{IN} - V_{OUT}) \times \frac{C_{sw}}{C_{sw} + C_{load}} \quad [1]$$

Under light (i.e. low output current) load conditions, the VOUT rising slope 208 is substantially less than (e.g. negligible against) the VOUT's falling slope 212. Thus, the VOUT ripple frequency is defined by the discharge of the load capacitance over ΔV:

$$VOUT_{frequency} = \frac{I_{load}}{C_{load} \times \Delta V} \quad [2]$$

With $I_{load}$ equal to the load's current. Integrating formula [1] inside formula [2], the VOUT frequency can be written as a function of the load's current and the output voltage 202 (VOUT), see equation [3].

$$VOUT_{frequency} = I_{load} \times \frac{C_{sw} + C_{load}}{C_{load} \times C_{sw}} \times \frac{1}{(2 \times V_{IN} - V_{OUT})} \quad [3]$$

As can be seen from equation [3], the SCPC's 100 output ripple 210 (ΔV) frequency depends upon the load's current $I_{load}$.

Under dynamic circuit conditions, the SCPC's 100 output ripple 210 (ΔV) frequency (i.e. switching frequency) varies with the load's current.

In some example circuit applications, at light load currents the output ripple 210 (ΔV) frequency can be below 20 KHz, which is in the human audible hearing range (e.g. 20 Hz to 20 KHz). Depending upon an application, the output ripple 210 (ΔV) frequency can be amplified by driving mechanical vibrations of other circuit components, such that an audible noise can readily be heard (e.g. perhaps making an audible whistling sound at small load currents).

In some example applications, such variable switching frequencies will sometimes fall within the human audible frequency range and other times fall outside of the human audible frequency range, depending upon the load's current.

The exact load currents that could cause such audible noise vary with the SCPC's 100 application, however in one example embodiment can be in the range of 5 mA. In certain security/smartcard applications, such noise could create a security risk.

One possible workaround to such light load current audible vibrations is to add a resistive load at the SCPC's 100 output. This however could lead to increased SCPC 100 power consumption, even at no load, thereby decreasing the SCPC's 100 power efficiency at light loads.

Another possible approach places the SCPC 100 in an open loop mode at light current loads. This can be done by removing the SCPC's 100 output voltage regulation. In this approach, the output voltage (VOUT) of the SCPC 100 is equal to the input voltage (VIN) multiplied by two. The free running SCPC's 100 output ripple 210 (ΔV) frequency would then be about equal to the SCPC's 100 switching clock (CLK) frequency, thereby reducing audible noise if the clock is switched at frequencies higher than 20 KHz.

In another approach, potential audio noise is addressed by modulating a resistance of the SCPC's 100 switches S1, S2, S3, S4 against the load 120. At a light current load, the switches S1, S2, S3, S4 are highly resistive, and the SCPC's 100 output ripple 210 (ΔV) amplitude is reduced.

In yet another approach, audio noise is addressed by adjusting an internal load (not shown) on the SCPC's 100 voltage output 108 in order to fix the SCPC's 100 output frequency. Nevertheless, this approach can lead to decreasing the power efficiency since the internal load adds an additional load current at the SCPC's 100 voltage output 108.

Discussed in more detail below is another approach for attenuating audio noise from a SCPC. This approach improves the power efficiency of a power converter (e.g. SCPC) under light load conditions.

In this approach, see equation [3], under light load conditions the VOUT-frequency is increased at least beyond the human audible range by increasing VOUT. Increasing VOUT under light load conditions results in a higher switching frequency, which pushes output ripple noise outside of audible frequencies. In another example embodiment, the output ripple can be shifted outside of an NFC communication bandwidth (e.g. 100 KHz to 1 MHz), to reduce or eliminate interference with NFC communications.

Benefits of this approach include: no external load so better power efficiency; get rid of possible audio noise from SCPC operation whatever load is; and as no additional load current on SCPC output, the power efficiency is stable whatever load is. Applications of this noise attenuated SCPC include: contact smartcard readers; and NFC booster applications based on SCPC. Assuming no capacitive losses, the SCPC's power efficiency stays about the same regardless of the SCPC output voltage. In case of an SCPC filtered by an LDO, VOUT variations will have no impact as good LDO power supply rejection ratio (PSRR) for light loads.

Figure 3:
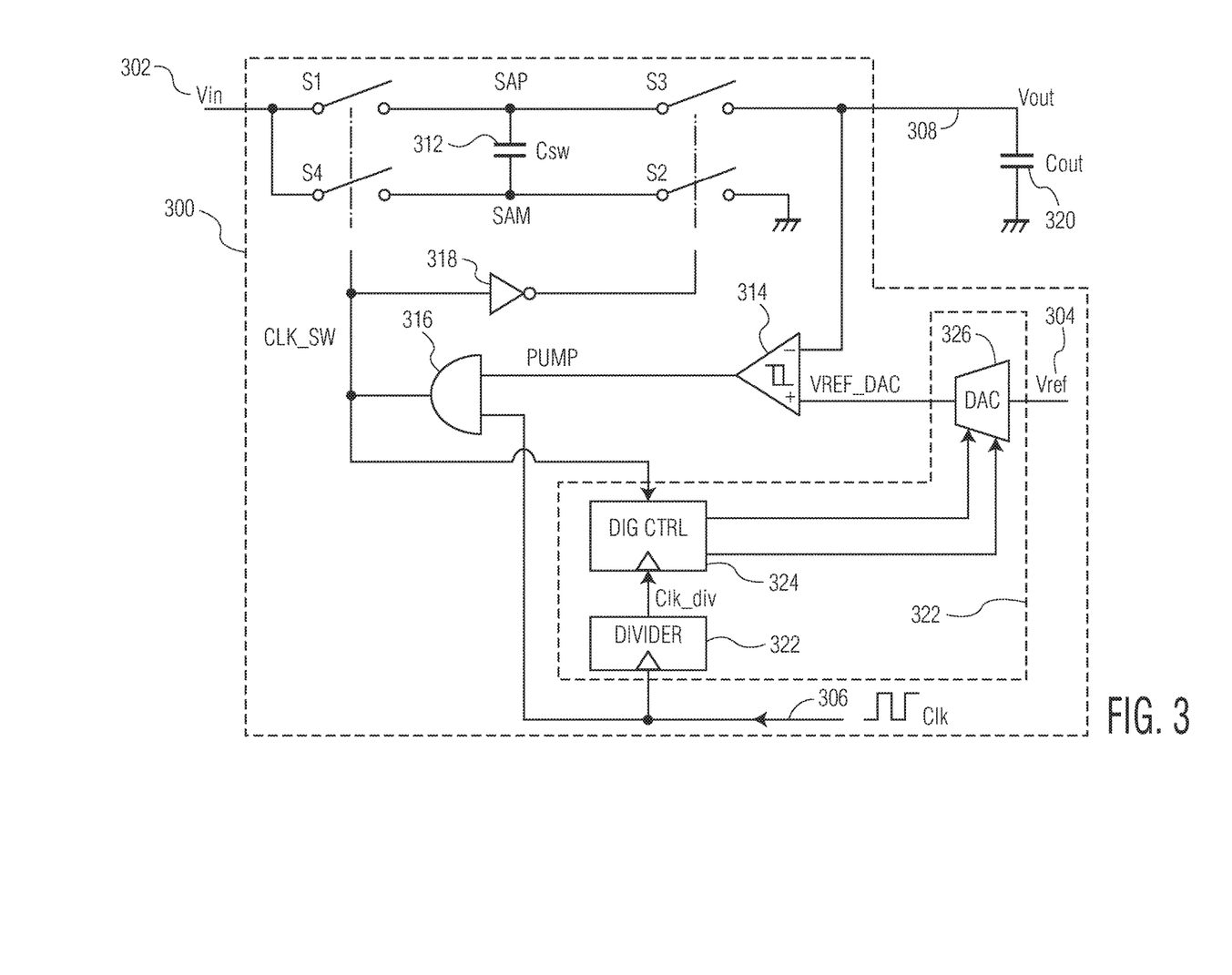
FIG. 3 is a second example of a power converter.

FIG. 3 is a second example of a power converter 300, which shows an example of this frequency shifting approach. The second power converter 300 is a Switching Capacitive Power Converter (SCPC) which includes: a voltage input 302 (for receiving voltage VIN); a voltage reference input 304 (for receiving voltage VREF); a clock input 306; a voltage output 308 (for providing voltage VOUT); switches S1, S2, S3, S4; a switched capacitor 312 (e.g. flying capacitor or CSW); a comparator 314; an enable element 316 (e.g. an AND gate); and an inverter 318 (e.g. a NOT gate).

The SCPC power converter 300 also includes a voltage reference controller 332. The voltage reference controller 332 includes: a clock divider 322; a digital controller 324; and a DAC 326 (digital to analog converter).

The second power converter 300 is connected to COUT and a load (not shown) at the voltage output 308. The load draws a load current for a given VOUT voltage.

A set of signals internal to the SCPC power converter 300 include: a CLK_DIV signal 328 (low frequency internal clock); an UP signal 330; a DOWN signal 332; a VREF_DAC signal 334 (aka. adjusted reference voltage, or set point signal); a PUMP signal 336; a CLK_SW signal 338; and a LOAD signal 340.

The SCPC power converter 300 essentially operates as described with reference to FIG. 1. However, the voltage reference controller 332 monitors the CLK_SW signal 338 frequency (i.e. SCPC 300 pumping activity) and in response modifies the comparator's 314 voltage reference set point voltage using the VREF_DAC signal 334 to ensure the VOUT ripple on the voltage output 308 is not within a predetermined frequency exclusion range (e.g. human audible frequency range, NFC communications frequency range, etc.).

The clock divider 322 receives the CLK signal on the clock input 306, and divides the CLK signal frequency to a lower CLK_DIV signal 328 frequency.

The digital controller 324 receives and monitors the CLK_SW signal 338 which indicates the SCPC's 300 pumping frequency. The digital controller 324 also receives and is clocked by the CLK_DIV signal 328.

If the CLK_SW signal 338 frequency is within the predetermined frequency exclusion range, the digital controller 324 in one example embodiment sends the UP signal 330 to the DAC 326 so that the VREF_DAC signal 334 is increased and the CLK_SW signal 338 frequency thus is increased above the predetermined frequency exclusion range. In another embodiment, the digital controller 324 sends the DOWN signal 332 to the DAC 326 so that the VREF_DAC signal 334 is decreased and the CLK_SW signal 338 frequency thus is decreased below the predetermined frequency exclusion range.

The DAC 326 receives VREF on the voltage reference input 304, and based on the UP and DOWN signals 330, 332 outputs a different voltage reference set point voltage (VREF_DAC signal 334) to the comparator 314.

In another example embodiment, if no CLK_SW signal 338 is received within a period of the CLK_DIV signal 328, the digital controller 324 keeps incrementing the voltage reference set point (VREF_DAC) until the CLK_SW signal's 338 frequency is outside of the predetermined frequency exclusion range. Then when the CLK_SW signal 338 frequency exceeds a predetermined maximum frequency (i.e. indicating that the load is drawing normal current again) the voltage reference set point (VREF_DAC) is decremented until below the predetermined maximum frequency. The predetermined maximum frequency is also outside of the predetermined frequency exclusion range so as to ensure that audible and/or other unwanted signal interference does not occur.

While the above examples mention increase/decrease, above/below, increment/decrement, UP/DOWN, etc., such terms in other example embodiments refer to absolute values of the references and voltages being compared. Thus embodiments operating at negative voltages as well as positive voltages are included in these example embodiments.

Figure 4:
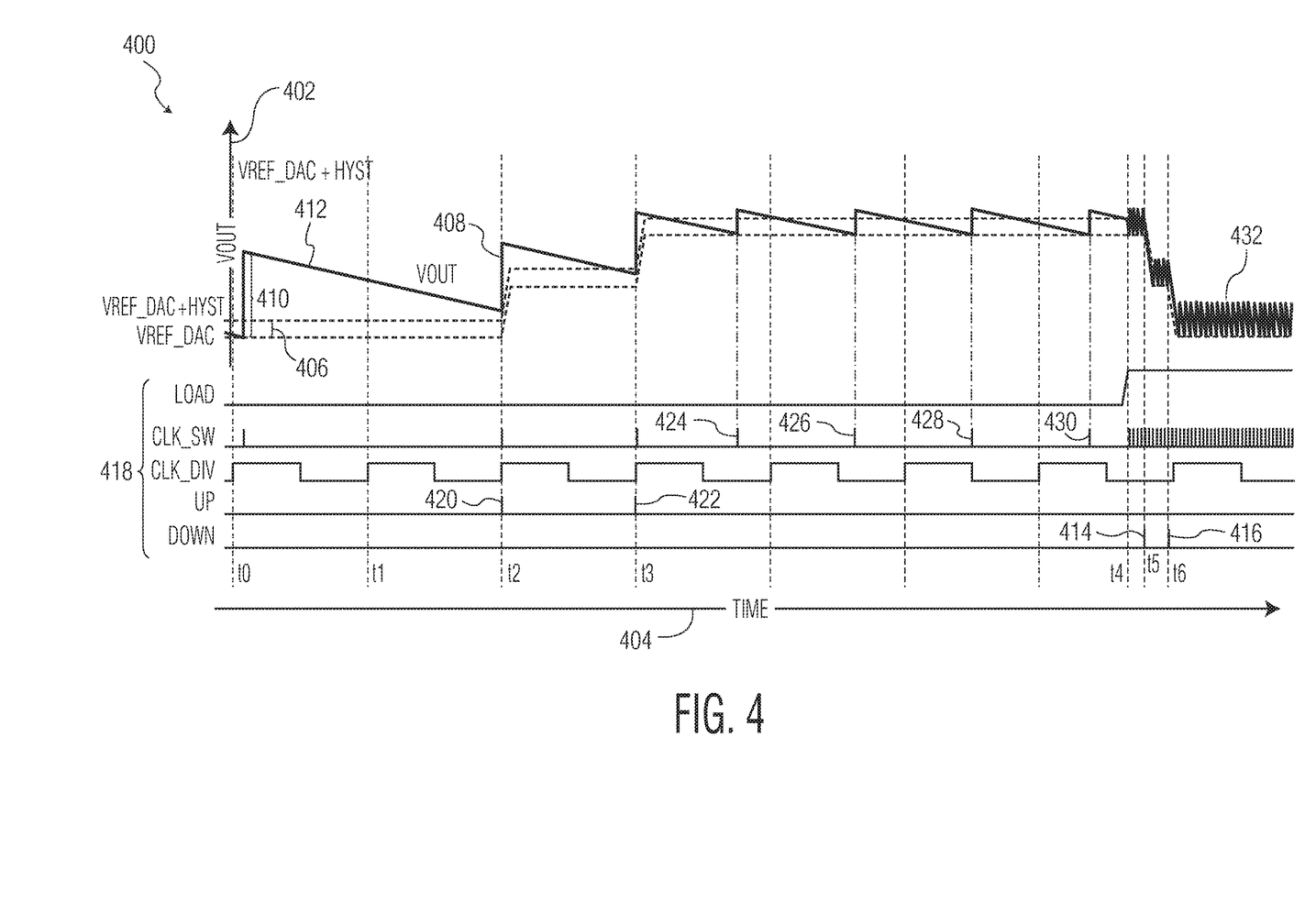
FIG. 4 is an example graph of the second power converter's output voltage and internal logic signals over time.

FIG. 4 is an example graph 400 of the second power converter's 300 output voltage (VOUT) and internal logic signals over time. The example graph 400 shows the output voltage 402 (VOUT) as a vertical axis and the time 404 as a horizontal axis. In a manner similar to that discussed in FIG. 2, also shown is: a voltage hysteresis window 406 (HYST); a rising slope 408; output ripple 410 ($\Delta V$); and a falling slope 412.

Also shown are a set of circuit signals 418 within the SCPC power converter 300. These signals 418 include: the CLK_DIV signal 328; the UP signal 330; the DOWN signal 332; the CLK_SW signal 338; and the LOAD signal 340.

The example graph 400 shows the behavior of the signals 418 in steady state during a SCPC load regulation. At t0, the SCPC 300 load current is low, and the SCPC regulates VOUT within a standard window.

Between t1 and t2, no SCPC 300 pumping activity (i.e. CLK_SW signal 338) is sensed during the period of the low frequency clock (CLK_DIV signal 328), so at t2 VREF_DAC 334 is incremented (i.e. UP signal 420 is sent to the DAC 326). As a result the SCPC's 300 output regulation window is higher, VOUT ripple is lower, and the SCPC's 300 output frequency increases.

Between t2 and t3, again no SCPC 300 pumping activity (i.e. CLK_SW signal 338) is sensed during the period of the low frequency clock (CLK_DIV signal 328), so at t3 VREF_DAC 334 is incremented again (i.e. UP signal 422). As a result the SCPC's 300 output regulation window is even higher. As before, since the SCPC's 300 output regulation window is higher, VOUT ripple is lower, and the SCPC's 300 output frequency increases further.

Between t3 and t4, only one pumping sequence (i.e. CLK_SW signals 424, 426, 428, 430) is seen during each period (see of the low frequency clock (CLK_DIV signal 328), so SCPC 300 regulation (i.e. VREF_DAC 334) is neither incremented or decremented.

By selecting the low frequency clock frequency (i.e. CLK_DIV signal 328 frequency) and ensuring that at least one pumping sequence occurs during the period of the low frequency clock, the digital controller 324 keeps the SCPC's 300 output frequency higher than an upper limit (e.g. 20 KHz) of the predetermined frequency exclusion range. Thus the SCPC's 300 output ripple frequency is pushed outside of the predetermined frequency exclusion range (e.g. audio bandwidth).

Between t4 and t5, more than four pumping sequences are detected by the digital controller 324, so at t4 VREF_DAC is decremented (i.e. DOWN signal 414). In other example embodiments, the number of pumping sequences within the period of the low frequency clock which causes the digital controller 324 to decrement the VREF_DAC signal 334 can vary, depending upon a predefined light load current level. An increased number of pumping sequences beyond this number indicates that the load is again drawing greater current.

Between t5 and t6, again more than four pumping sequence are detected by the digital controller 324, so at t5 VREF_DAC is again decremented (i.e. DOWN signal 416). VREF_DAC signal 334 decrements are stopped once VREF_DAC signal 334 returns to the standard voltage regulation window, even if the number of pumping sequences is greater than four.

After t6 432, the SCPC's 300 output voltage (VOUT) stays within the standard voltage regulation window in order to keep good performance regarding load voltage regulation.

Figure 5:
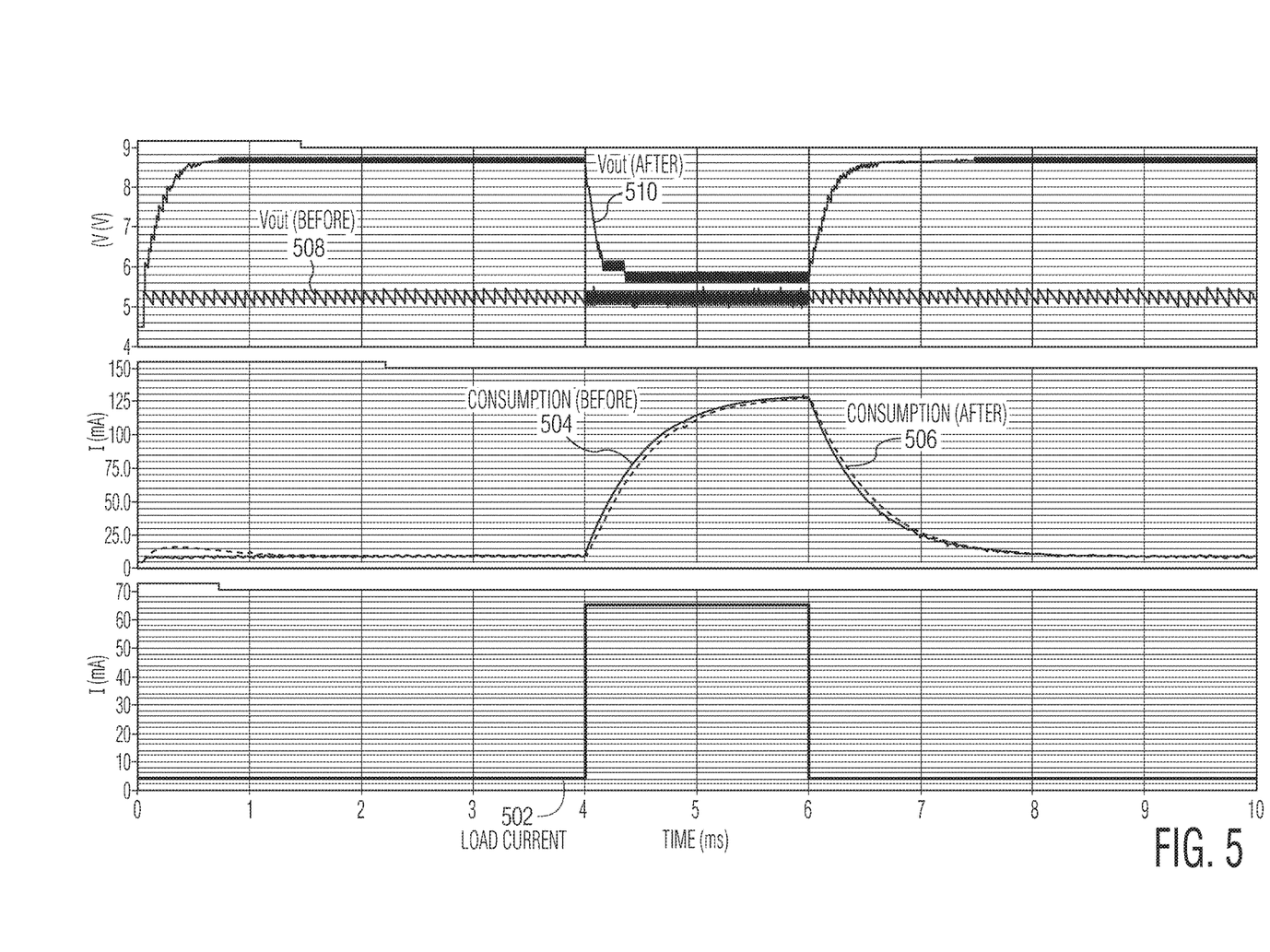
FIG. 5 is an example graph comparing output voltages, converter current and load current between a simulation of the first and second power converters over time.

FIG. 5 is an example graph 500 comparing output voltages, converter current and load current between a simulation of the first and second power converters 100, 300 over time. The graph 500 includes three portions: load current 502; first and second power converter 100, 300 currents 504, 506; and first and second power converter 100, 300 voltages 508, 510.

As discussed above, the first power converter 100 does not have the voltage reference controller 332, while the second power converter 300 does have the voltage reference controller 332.

The transient simulation, using Verilog-A, of the SCPC power converter 300 over 5 ms was performed (with typical process and ambient temperature). The SCPC 300 was set for 5.4V VOUT level. The SCPC 300 starts at a light load current (1 mA), then after 4 ms the SCPC 300 is loaded at 65 mA for 500 us before going back to a light load.

During a load regulation, the example graph 500 shows the SCPC's output voltage 508, 510 and current consumption 504, 506 both before and after operation of the voltage reference controller 332. At light load, the first power converter's 100 output ripple is equal to 12 KHz in steady state, whereas the second power converter's 300 output ripple goes to 40 KHz. Thus the voltage reference controller 332 pushes the SCPC's 300 output ripple frequency outside of the predetermined frequency exclusion range (e.g. audio bandwidth). There is little to no change regarding current consumption 504, 506.

Figure 6:
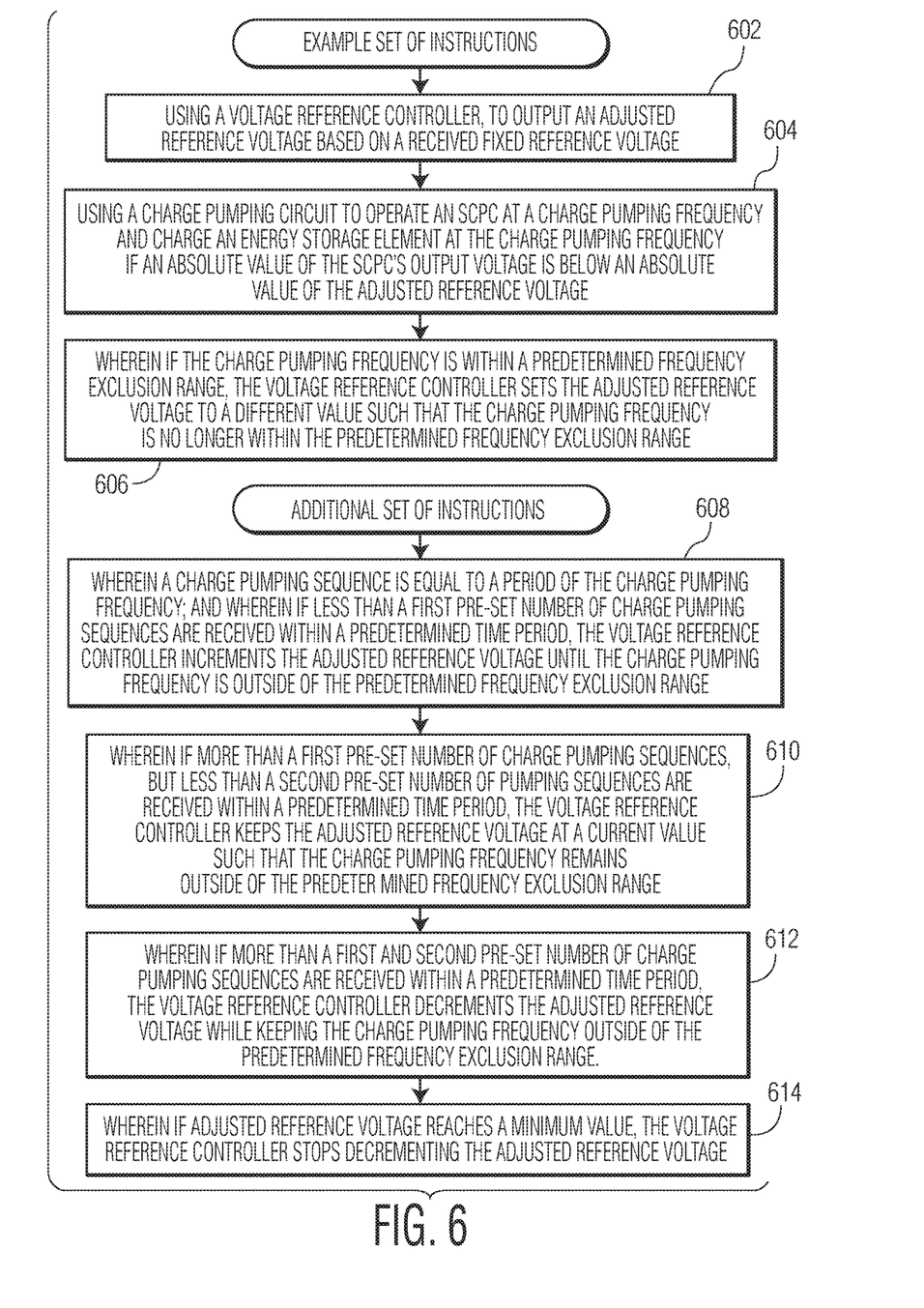
FIG. 6 is an example set of instructions for enabling the second power converter.

FIG. 6 is an example set of instructions 600 for enabling the second power converter. The order in which the instructions are discussed does not limit the order in which other example embodiments implement the instructions unless otherwise specifically stated. Additionally, in some embodiments the instructions are implemented concurrently.

A first example instruction set begins in 602, using a voltage reference controller, to output an adjusted reference voltage based on a received fixed reference voltage. In 604, using a charge pumping circuit to operate an SCPC at a charge pumping frequency and charge an energy storage element at the charge pumping frequency if an absolute value of the SCPC's output voltage is below an absolute value of the adjusted reference voltage. Then in 606, wherein if the charge pumping frequency is within a predetermined frequency exclusion range, the voltage reference controller sets the adjusted reference voltage to a different value such that the charge pumping frequency is no longer within the predetermined frequency exclusion range.

The instructions can be augmented or replaced with one or more of the following additional instructions, presented in no particular order:

608—wherein a charge pumping sequence is equal to a period of the charge pumping frequency; and wherein if less than a first pre-set number of charge pumping sequences are received within a predetermined time period, the voltage reference controller increments the adjusted reference voltage until the charge pumping frequency is outside of the predetermined frequency exclusion range;

610—wherein if more than a first pre-set number of charge pumping sequences, but less than a second pre-set number of pumping sequences are received within a predetermined time period, the voltage reference controller keeps the adjusted reference voltage at a current value such that the charge pumping frequency remains outside of the predetermined frequency exclusion range;

612—wherein if more than a first and second pre-set number of charge pumping sequences are received within a predetermined time period, the voltage reference controller decrements the adjusted reference voltage while keeping the charge pumping frequency outside of the predetermined frequency exclusion range; and 614—wherein if adjusted reference voltage reaches a minimum value, the voltage reference controller stops decrementing the adjusted reference voltage.

Figure 7:
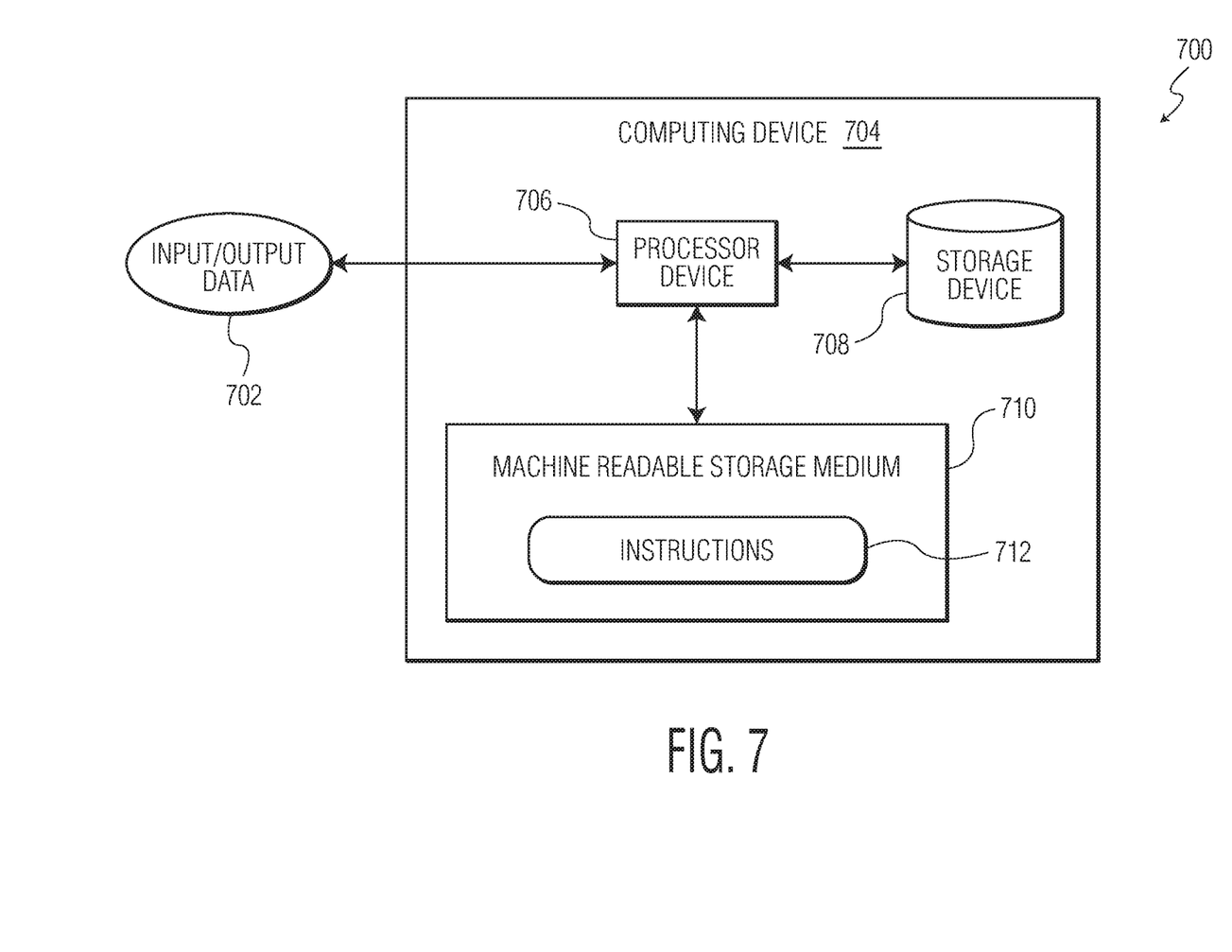
FIG. 7 is an example system for hosting instructions for enabling the second power converter.

FIG. 7 is an example system 700 for hosting instructions for enabling the second power converter. The system 600 shows an input/output data 602 interface with an electronic apparatus 604. The electronic apparatus 604 includes a processor 606, a storage device 608, and a non-transient machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A switching capacitive power converter (SCPC), comprising:
    an energy storage element;
    a voltage reference controller configured to output an adjusted reference voltage based on a received fixed reference voltage; and
    a charge pumping circuit configured to operate the SCPC at a charge pumping frequency and configured to charge the energy storage element at the charge pumping frequency if an absolute value of the SCPC's output voltage output from the charge pumping circuit is below an absolute value of the adjusted reference voltage;
    wherein if the charge pumping frequency is within a predetermined frequency exclusion range, the voltage reference controller is configured to set the adjusted reference voltage to a value such that the charge pumping frequency is no longer within the predetermined frequency exclusion range.

2. The power converter of claim 1:
    wherein the predetermined frequency exclusion range is at least one of: a human audible frequency range; 20 Hz 20 KHz; a Near Field Communication (NFC) communications frequency range; or 100 KHz to 1 MHz.

3. The power converter of claim 1:
    wherein the energy storage element is a capacitor.

4. The power converter of claim 1:
    wherein the SCPC is configured to output a high load current and a low load current; and
    wherein the charge pumping circuit is configured to operate the SCPC at a higher charge pumping frequency in response to the high load current and at a lower charge pumping frequency in response to the low load current.

5. The power converter of claim 1:
    wherein a charge pumping sequence is equal to a period of the charge pumping frequency; and
    wherein if less than a first pre-set number of charge pumping sequences are received within a predetermined time period, the voltage reference controller is configured to increment the adjusted reference voltage until the charge pumping frequency is outside of the predetermined frequency exclusion range.

6. The power converter of claim 1:
    wherein a charge pumping sequence is equal to a period of the charge pumping frequency; and
    wherein if more than a first pre-set number of charge pumping sequences, but less than a second pre-set number of pumping sequences are received within a predetermined time period, the voltage reference controller is configured to keep the adjusted reference voltage at a current value such that the charge pumping frequency remains outside of the predetermined frequency exclusion range.

7. The power converter of claim 1:
    wherein a charge pumping sequence is equal to a period of the charge pumping frequency; and
    wherein if more than a first and second pre-set number of charge pumping sequences are received within a predetermined time period, the voltage reference controller is configured to decrement the adjusted reference voltage while keeping the charge pumping frequency outside of the predetermined frequency exclusion range.

8. The power converter of claim 7:
    wherein if the adjusted reference voltage reaches a minimum value, the voltage reference controller is configured to stop decrementing the adjusted reference voltage.

9. The power converter of claim 1:
    further comprising a set of switches coupling the charge pumping circuit and the power converter's voltage output to the energy storage element.

10. The power converter of claim 1:
    wherein the SCPC is a DC to DC power converter.

11. The power converter of claim 1:
wherein the adjusted reference voltage is set with a Digital to Analog Converter (DAC).

12. An article of manufacture including at least one non-transitory, tangible machine readable storage medium containing executable machine instructions for power conversion, comprising:
wherein the article includes a switching capacitive power converter (SCPC), having:
an energy storage element;
a voltage reference controller, and
a charge pumping circuit;
wherein the instructions include:
using the voltage reference controller, to output an adjusted reference voltage based on a received fixed reference voltage; and
using the charge pumping circuit to operate the SCPC at a charge pumping frequency and charge the energy storage element at the charge pumping frequency if an absolute value of the SCPC's output voltage output from the charge pumping circuit is below an absolute value of the adjusted reference voltage;
wherein if the charge pumping frequency is within a predetermined frequency exclusion range, the voltage reference controller sets the adjusted reference voltage to a different value such that the charge pumping frequency is no longer within the predetermined frequency exclusion range.

13. The article of claim 12:
wherein a charge pumping sequence is equal to a period of the charge pumping frequency; and
wherein if less than a first pre-set number of charge pumping sequences are received within a predetermined time period, the voltage reference controller increments the adjusted reference voltage until the charge pumping frequency is outside of the predetermined frequency exclusion range.

14. The article of claim 12:
wherein a charge pumping sequence is equal to a period of the charge pumping frequency; and
wherein if more than a first pre-set number of charge pumping sequences, but less than a second pre-set number of pumping sequences are received within a predetermined time period, the voltage reference controller keeps the adjusted reference voltage at a current value such that the charge pumping frequency remains outside of the predetermined frequency exclusion range.

15. The article of claim 12:
wherein a charge pumping sequence is equal to a period of the charge pumping frequency; and
wherein if more than a first and second pre-set number of charge pumping sequences are received within a predetermined time period, the voltage reference controller decrements the adjusted reference voltage while keeping the charge pumping frequency outside of the predetermined frequency exclusion range.

16. The article of claim 15:
wherein if the adjusted reference voltage reaches a minimum value, the voltage reference controller stops decrementing the adjusted reference voltage.

* * * * *